(12) United States Patent
Tan

(10) Patent No.: US 8,798,404 B2
(45) Date of Patent: Aug. 5, 2014

(54) MAKING AVAILABLE TO A USER MACHINE EDITABLE TEXT EXTRACTED FROM AN IMAGE

(76) Inventor: Hin Leong Tan, Sunnyvale, CA (US)

(*) Notice: Subject to any disclaimer, the term of this patent is extended or adjusted under 35 U.S.C. 154(b) by 932 days.

(21) Appl. No.: 12/788,046

(22) Filed: May 26, 2010

(65) Prior Publication Data
US 2011/0293183 A1 Dec. 1, 2011

(51) Int. Cl.
G06K 7/10 (2006.01)
G06K 9/78 (2006.01)
G06K 9/00 (2006.01)

(52) U.S. Cl.
CPC ........ G06K 9/00993 (2013.01); *G06K 2209/01* (2013.01); G06K 9/78 (2013.01)
USPC .......................................... 382/321; 382/182

(58) Field of Classification Search
USPC ........................................................ 382/321
See application file for complete search history.

(56) References Cited

U.S. PATENT DOCUMENTS

| | | | | |
|---|---|---|---|---|
| 5,506,918 A * | 4/1996 | Ishitani | ........................ | 382/289 |
| 5,740,271 A * | 4/1998 | Kunkler et al. | ................ | 382/137 |
| 6,594,503 B1 * | 7/2003 | Herzig et al. | ............... | 455/550.1 |
| 2002/0033974 A1 * | 3/2002 | Chen et al. | ..................... | 358/474 |
| 2002/0130185 A1 * | 9/2002 | LaForge et al. | ............... | 235/487 |
| 2003/0103250 A1 * | 6/2003 | Kidokoro et al. | ............. | 358/524 |
| 2003/0177448 A1 * | 9/2003 | Levine et al. | ................. | 715/530 |
| 2003/0185448 A1 * | 10/2003 | Seeger et al. | ................. | 382/229 |
| 2004/0017942 A1 * | 1/2004 | Park | .............................. | 382/181 |
| 2005/0174613 A1 * | 8/2005 | Tan | ................................. | 358/486 |
| 2005/0185225 A1 * | 8/2005 | Brawn et al. | .................... | 358/401 |
| 2005/0274914 A1 * | 12/2005 | Scanlon et al. | ........... | 250/559.08 |
| 2007/0094296 A1 * | 4/2007 | Peters, III | ...................... | 707/102 |
| 2009/0154778 A1 * | 6/2009 | Lei et al. | ........................ | 382/112 |
| 2009/0169131 A1 * | 7/2009 | Nestares et al. | ............... | 382/292 |
| 2010/0097663 A1 * | 4/2010 | Tan | ................................. | 358/474 |
| 2010/0223340 A1 * | 9/2010 | Pope et al. | ...................... | 709/206 |
| 2010/0315688 A1 * | 12/2010 | Nielsen et al. | ................. | 358/474 |
| 2011/0078706 A1 * | 3/2011 | Lawson et al. | ................. | 719/323 |
| 2011/0153515 A1 * | 6/2011 | Pitzo et al. | ...................... | 705/342 |

FOREIGN PATENT DOCUMENTS

EP 978087 B1 * 6/2009 ............... G06K 9/03

OTHER PUBLICATIONS

NewSoft Presto! BizCard, User's Guide, 2006, NewSoft Technology Corp., pp. 1-72.*

* cited by examiner

*Primary Examiner* — Jayesh A Patel
(74) *Attorney, Agent, or Firm* — Douglas L. Weller

(57) ABSTRACT

A system includes an imaging device and an acquisition layer. The imaging device acquires an image. The acquisition layer is logically located between a source manager and the imaging device, the source manager being called by an application when a user of the system requests to acquire the image. The acquisition layer includes imaging acquisition logic that receives the image from the imaging device and performs optical character recognition (OCR) that extracts machine editable text from the image. The acquisition layer forwards the image to the application and makes the machine editable text available to the user.

19 Claims, 13 Drawing Sheets

MAKING AVAILABLE TO A USER MACHINE EDITABLE TEXT EXTRACTED FROM AN IMAGE

BACKGROUND

TWAIN is a protocol and applications programming interface (API) that controls communication between application software and imaging devices such as scanners and digital cameras. The word TWAIN is from the phrase " . . . and never the twain shall meet . . . " in Rudyard Kipling's "The Ballad of East and West" and reflects the difficulty of connecting scanners and computing devices which is intended to be alleviated by the TWAIN protocol.

Once application software has obtained an image from an imaging device using the TWAIN protocol, the application software can call optical character recognition (OCR) software to translate text within the image into machine editable text. The OCR returns the machine editable text to the application software directly or by storing the machine editable text into a text file accessible by the application software.

SUMMARY

In accordance with an embodiment of the invention, a system includes an imaging device and an acquisition layer. The imaging device acquires an image. The acquisition layer is logically located between a source manager and the imaging device, the source manager being called by an application when a user of the system requests to acquire the image. The acquisition layer includes imaging acquisition logic that receives the image from the imaging device and performs optical character recognition (OCR) that extracts machine editable text from the image. The acquisition layer forwards the image to the application and makes the machine editable text available to the user.

DESCRIPTION OF THE EMBODIMENT

Figure 1:
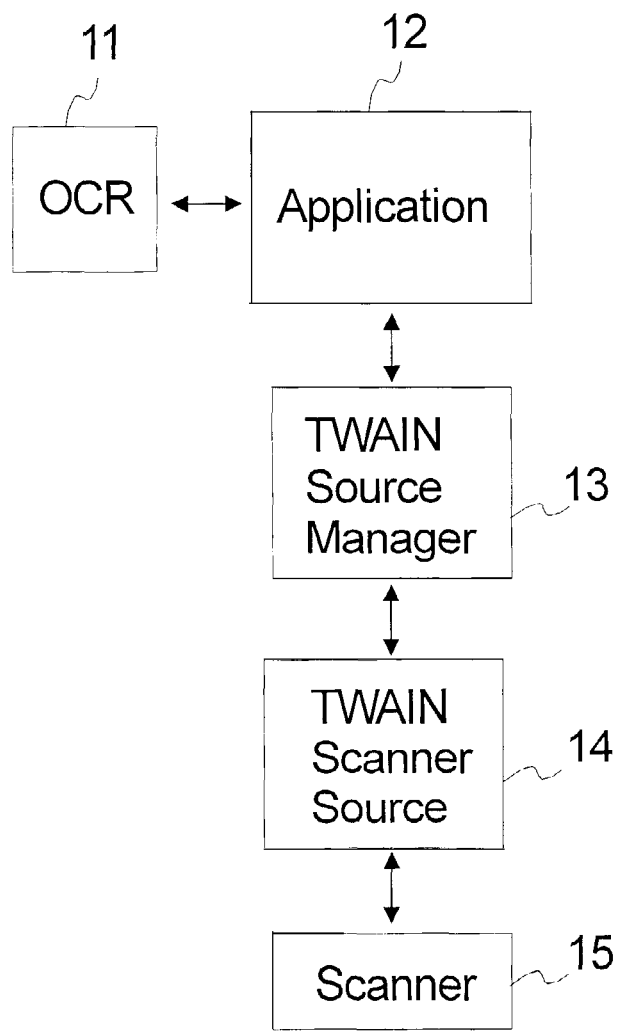
FIG. 1 is a simplified block diagram illustrating a system in which an application program obtains an image from a scanner using the TWAIN protocol and calling optical character recognition (OCR) software to convert text within the image into machine editable text in accordance with the prior art.

FIG. 1 is a simplified block diagram illustrating a system in which an application program 12 obtains an image from a scanner 15 using a TWAIN source manager 13 and a TWAIN scanner source 14. Optical character recognition (OCR) software 11 can be used to obtain machine editable text from the scanned image.

Figure 2:
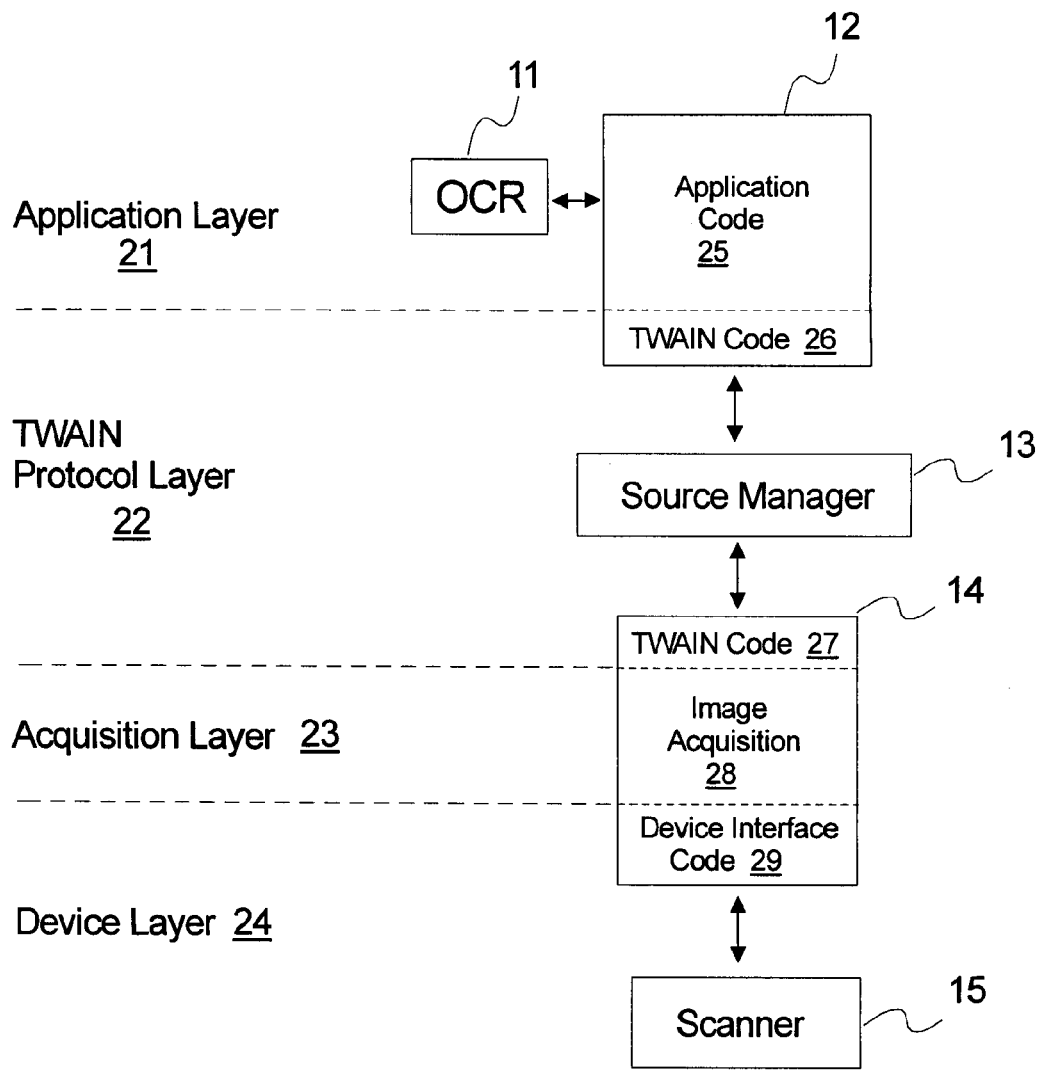
FIG. 2 provides additional information represented by the block diagram shown in FIG. 1.

As illustrated by FIG. 2, the system of FIG. 1 can be partitioned into an application layer 21, a TWAIN protocol layer 22 an acquisition layer 23 and a device layer 24. OCR 11 and application code 25 within application 12 are within application layer 21. TWAIN code 26 within application 12, TWAIN source manager 13 and TWAIN code 27 within TWAIN scanner source 14 are within TWAIN protocol layer 22. Image acquisition block 28 within TWAIN scanner source 14 is within acquisition layer 23. Device interface code 29 of TWAIN scanner source 14 and scanner 15 are within device layer 24.

Figure 3:
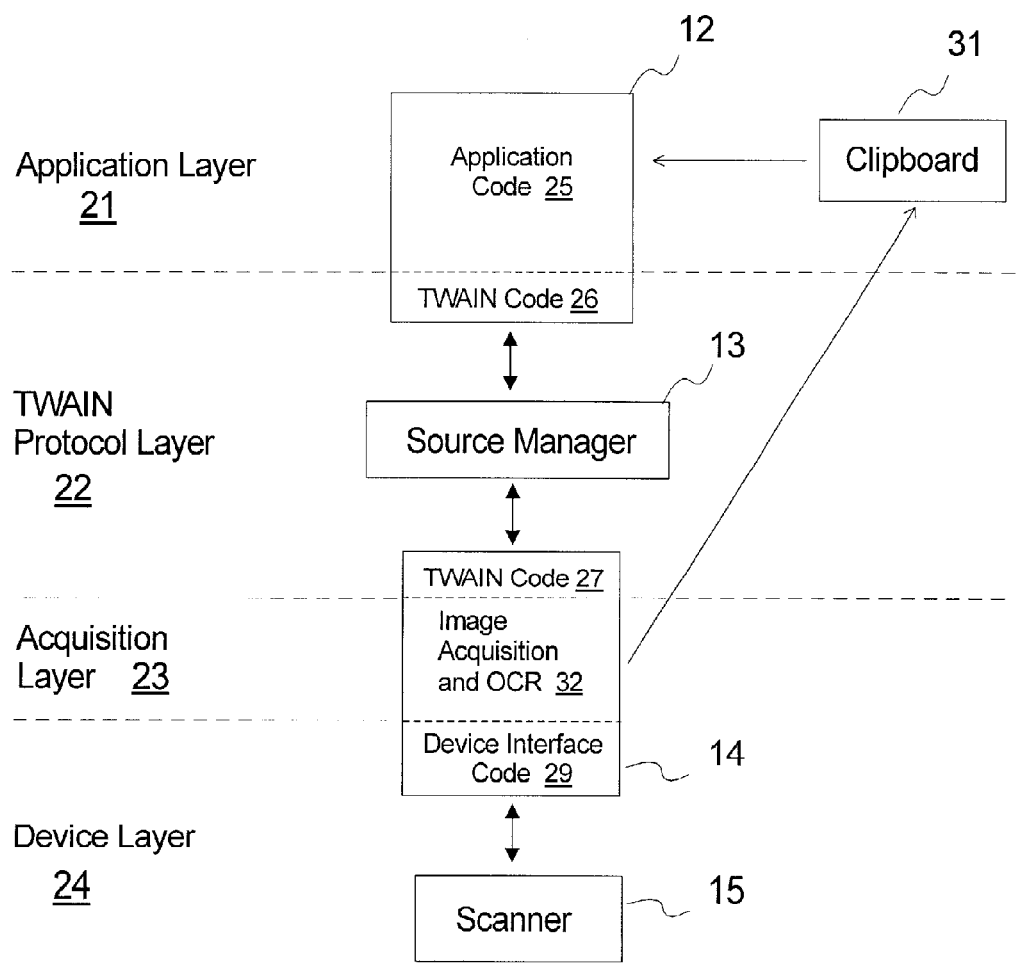
FIG. 3 shows a system in which OCR is performed in an image acquisition layer in accordance with an embodiment of the invention.

In accordance with an embodiment of the invention, FIG. 3 shows that OCR capability is implemented within acquisition layer 23. Specifically image acquisition and OCR 32 of TWAIN scanner source 14 are included within acquisition layer 23. Machine editable text obtained by image acquisition and OCR 32 is transferred via a clipboard 31 to application code 25 of application 12.

Figure 4:
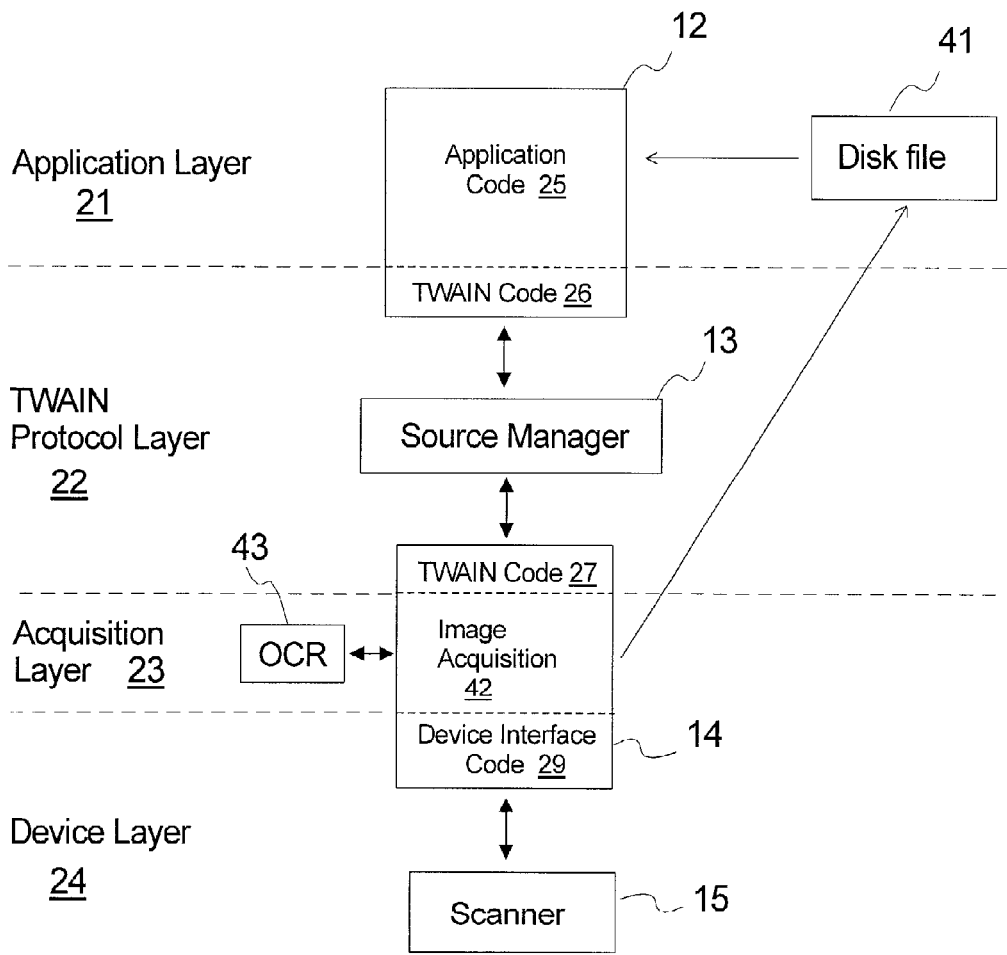
FIG. 4 shows a system in which OCR is performed in an image acquisition layer in accordance with another embodiment of the invention.

In accordance with another embodiment of the invention, FIG. 4 shows that OCR software 43 is called by image acquisition block 42 within TWAIN scanner source 14 located within acquisition layer 23. OCR 43 and image acquisition block 42 are thus both within the acquisition layer 23. Machine editable text obtained by image acquisition block 42 from OCR 43 is transferred via a disk file 41 to application code 25 of application 12.

Figure 5:
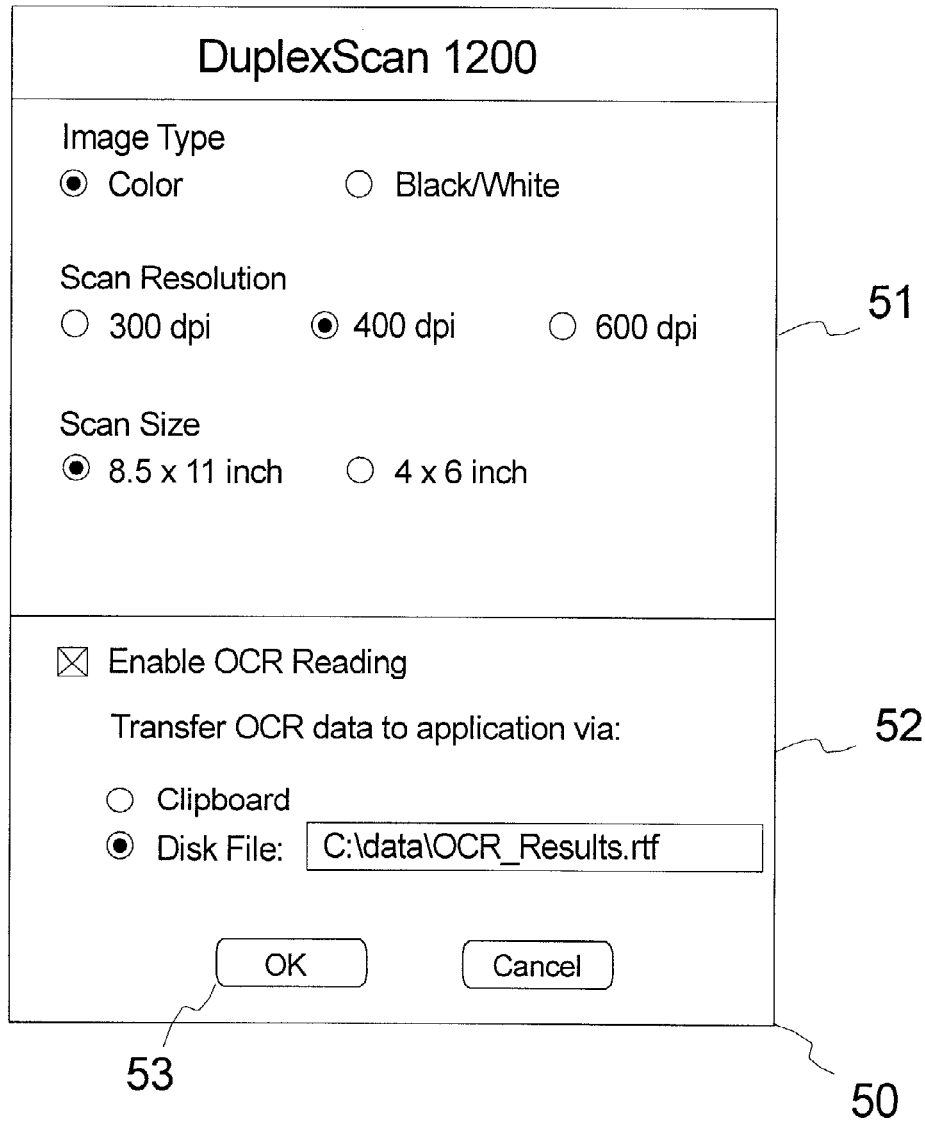
FIG. 5 shows a part of a graphics user interface of a system such as that shown in FIG. 3 and FIG. 4 in accordance with an embodiment of the invention.

FIG. 5 shows a dialog box 50 displayed to a user by scanner image acquisition block within acquisition layer 23. Dialog box 50 allows a user to select parameters for a scan. In a section 51 of dialog box 50, a user can select image type, scan resolution and scan size. In a section 52 of dialog box 50, a user can chose to enable OCR reading and can select how machine editable text will be accessible to an application. The listed options are clipboard and disk file. In different embodiments other options, such as direct transfer into the application, could be listed. A user can select OK button 53 to begin the image acquisition.

Figure 6:
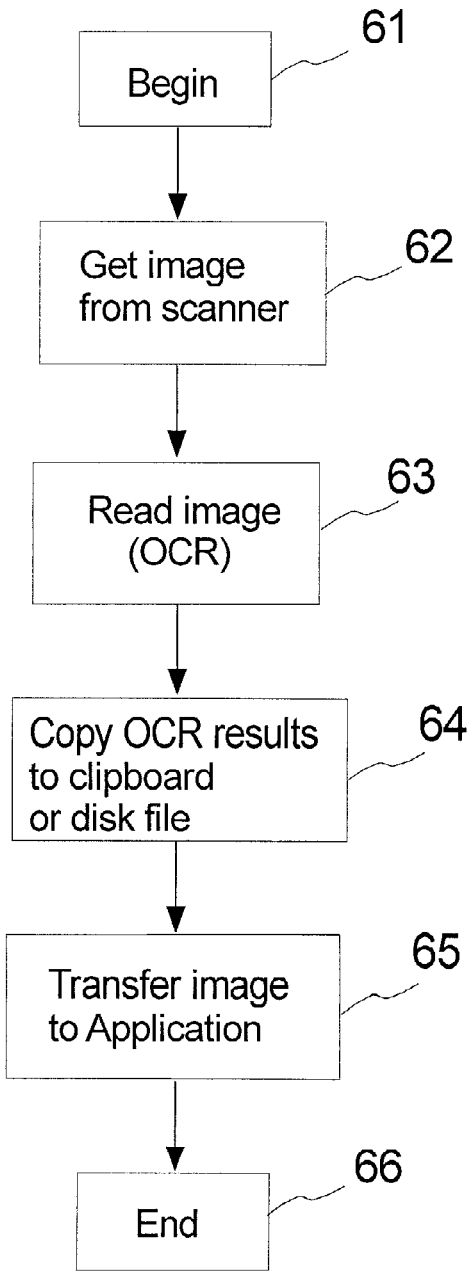
FIG. 6 is a simplified flowchart illustrating a process of scanning and OCR in accordance with an embodiment of the invention.

FIG. 6 is a simplified flowchart that illustrates functionality performed within acquisition layer 23. In a step 61, the acquisition block is called by TWAIN source manager 13 to obtain image data from a scanner or other imaging device. In a step 62, the acquisition block retrieves an image from, for example, scanner 15. In a step 63, OCR is performed on the retrieved image. For example, image acquisition and OCR 32 includes OCR software that performs OCR on a retrieved image. Image acquisition block 42, on the other hand, calls a separate OCR block 43 to perform OCR on a retrieved image.

In a step 64, the image acquisition block copies the OCR results to a clipboard or to a disk file. In a step 65, the image acquisition block transfers the original retrieved image to application 12. In a step 66, the image acquisition process is completed.

Figure 7:
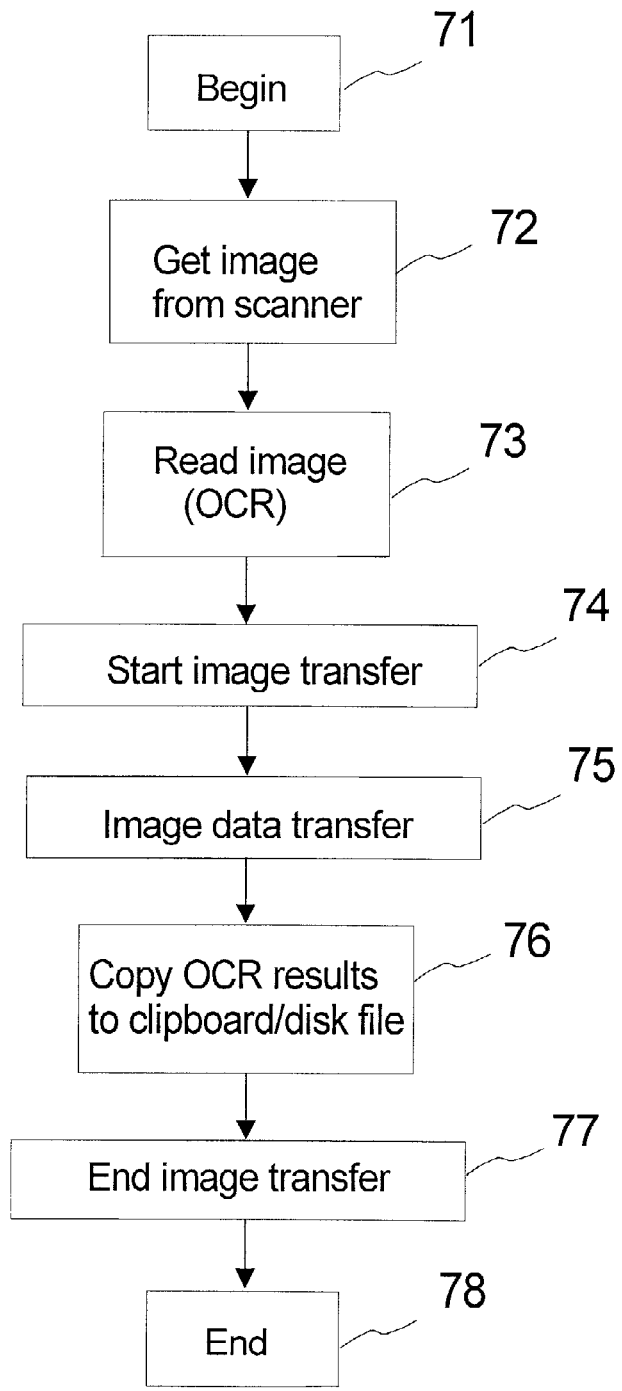
FIG. 7 is a simplified flowchart illustrating a process of scanning and OCR in accordance with another embodiment of the invention.

FIG. 7 is a simplified flowchart illustrating image acquisition within acquisition layer 23 in accordance with another embodiment of the invention. In a step 71, the acquisition block is called by TWAIN source manager 13 to obtain image data from a scanner or other imaging device. In a step 72, the acquisition block retrieves an image from, for example, scanner 15. In a step 73, OCR is performed on the retrieved image. For example, image acquisition and OCR 32 includes OCR software that performs OCR on a retrieved image. Image acquisition block 42, on the other hand, calls a separate OCR block 43 to perform OCR on a retrieved image.

In a step 74, the image acquisition layer 23 signals to application 12 that the image acquisition block is starting a process to transfer the original retrieved image. In a step 75, the image acquisition block transfers the original retrieved image to application 12. In a step 76, the image acquisition block copies the OCR results to a clipboard or to a disk file. In a step 77, the image acquisition block signals to application 12 that the image acquisition block has completed the process to transfer the original retrieved image. In a step 78, the image acquisition process is completed.

Figure 8:
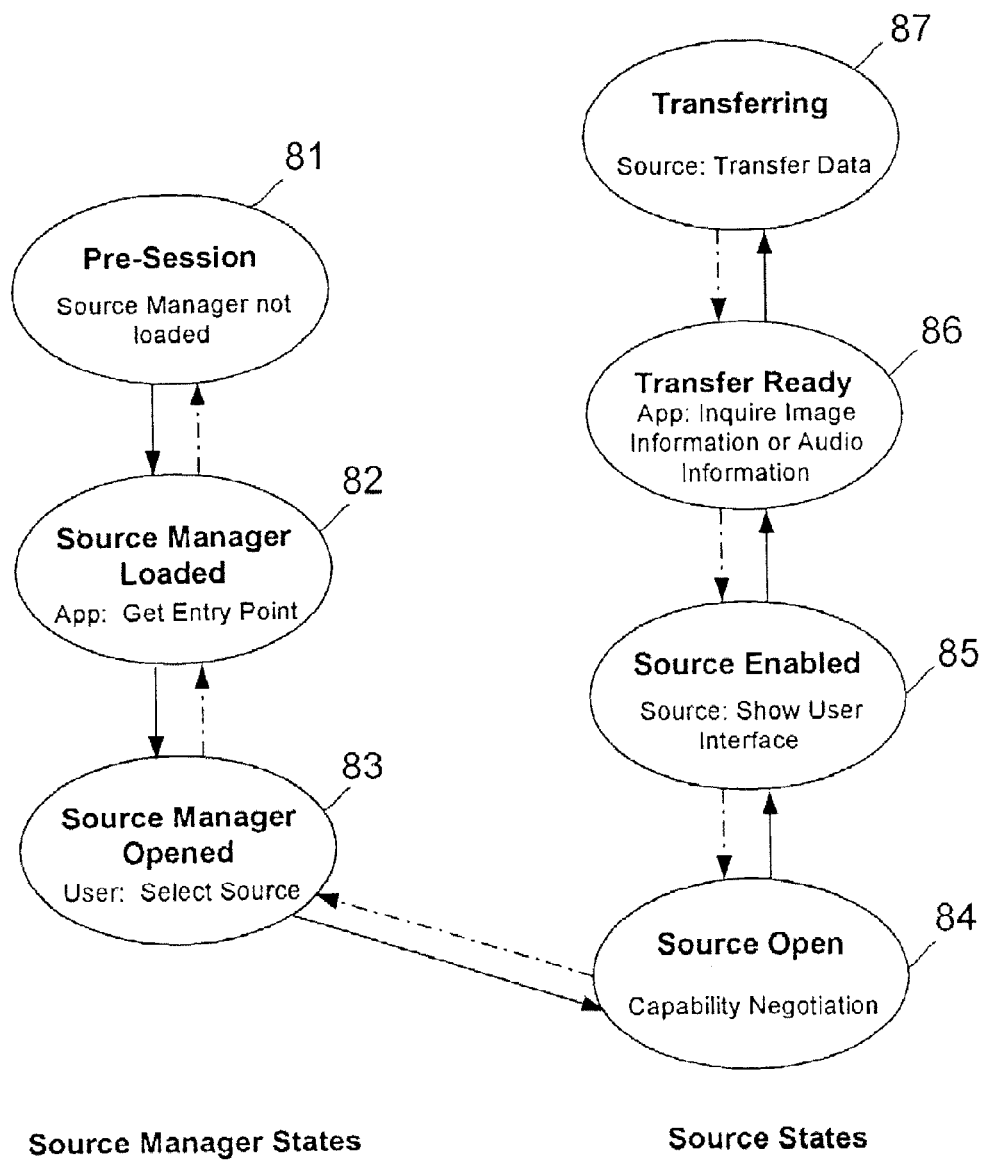
FIG. 8 is a simplified state diagram illustrating operation of a source manager and a scanner source.

FIG. 8 is a simplified state diagram illustrating operation of TWAIN source manager 13 and TWAIN scanner source 14. In a pre-session state 81, TWAIN source manager 13 is not loaded. Upon application 12 uploading TWAIN source manager 13, a source manager loaded state 82 is entered. In source manager state 82 the application receives an entry point to TWAIN source manager 13.

Upon application 12 opening TWAIN source manager 13, a source manager opened state 83 is entered. In source manager opened state 83, a user is able to select an image device as a source to obtain an image. The image source is typically a scanner, digital camera or some other entity capable of obtaining a digital image. In this example, scanner 15 is selected.

Upon application 12 opening the source (e.g. the source for scanner 15) selected by the user, a source open state 84 is opened. In source open state 84, capability negotiation is conducted between TWAIN scanner source 14 and TWAIN source manager 13.

When a user requests to retrieve an image and when application 12 has enabled a source, a source enabled state 85 is opened. In source enabled state 85, TWAIN scanner source 14 displays a user interface to the user, for example, the scanner source user interface shown in FIG. 5. When TWAIN scanner source 14 notifies application 12 that the transfer is ready, a transfer ready state 86 is entered. In transfer ready state 86, application 12 requests image information.

When application 12 initiates the transfer, a transferring state 87 is entered. In transferring state 87, the requested image is transferred to application 12.

After completion of the transfer, the states are traversed and exited in reverse order. When application 12 acknowledges the end of the transfer, transferring state 87 is exited to transfer ready state 86. When no more image transfers are pending, transfer ready state 86 is exited to source enabled state 85. When TWAIN scanner source 14 notifies application to disable TWAIN scanner source 14, source enabled state 85 is exited to source open state 84. When application 12 closes TWAIN scanner source 14, source open state 84 is exited to source manager opened state 83. When application closes TWAIN source manager 13, source manager opened state 83 is exited to source manager loaded state 82. When application 12 unloads TWAIN source manager 13, source manger loaded state 82 is exited to pre-session state 81.

Figure 9:
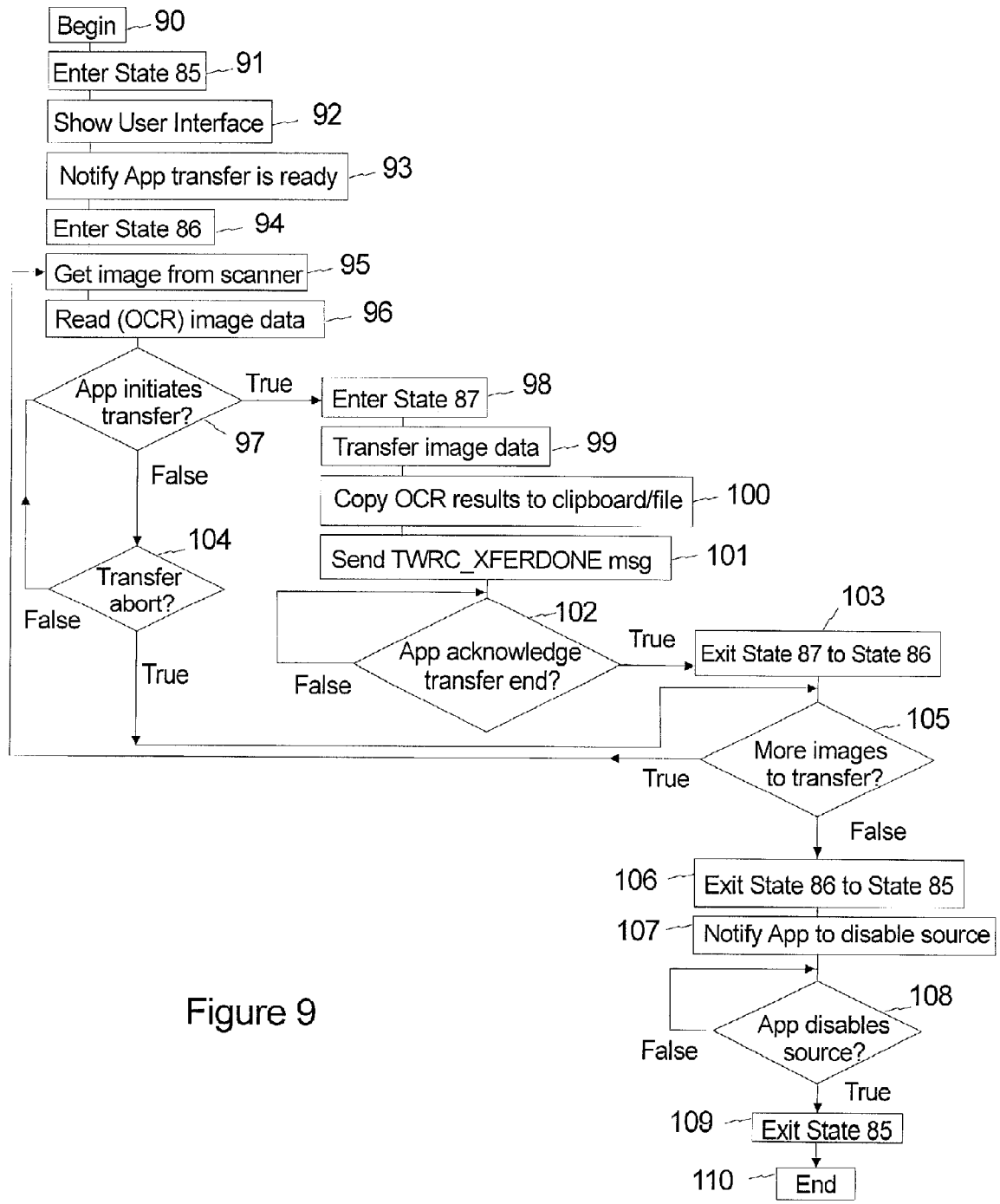
FIG. 9 is a simplified flowchart illustrating a process of scanning and OCR with an acquisition layer in accordance with another embodiment of the invention.

FIG. 9 is a simplified flowchart illustrating logical operations performed by acquisition layer 23 within various states shown in FIG. 8. In a step 90, TWAIN scanner source 14 is opened and enabled. In a step 91, TWAIN scanner source 14 enters state 85 (shown in FIG. 8). In step 92, TWAIN scanner source 14 displays to a user an interface, for example, the scanner source user interface shown in FIG. 5. An alternative scanner source user interface 120 is shown in FIG. 12.

Figure 12:
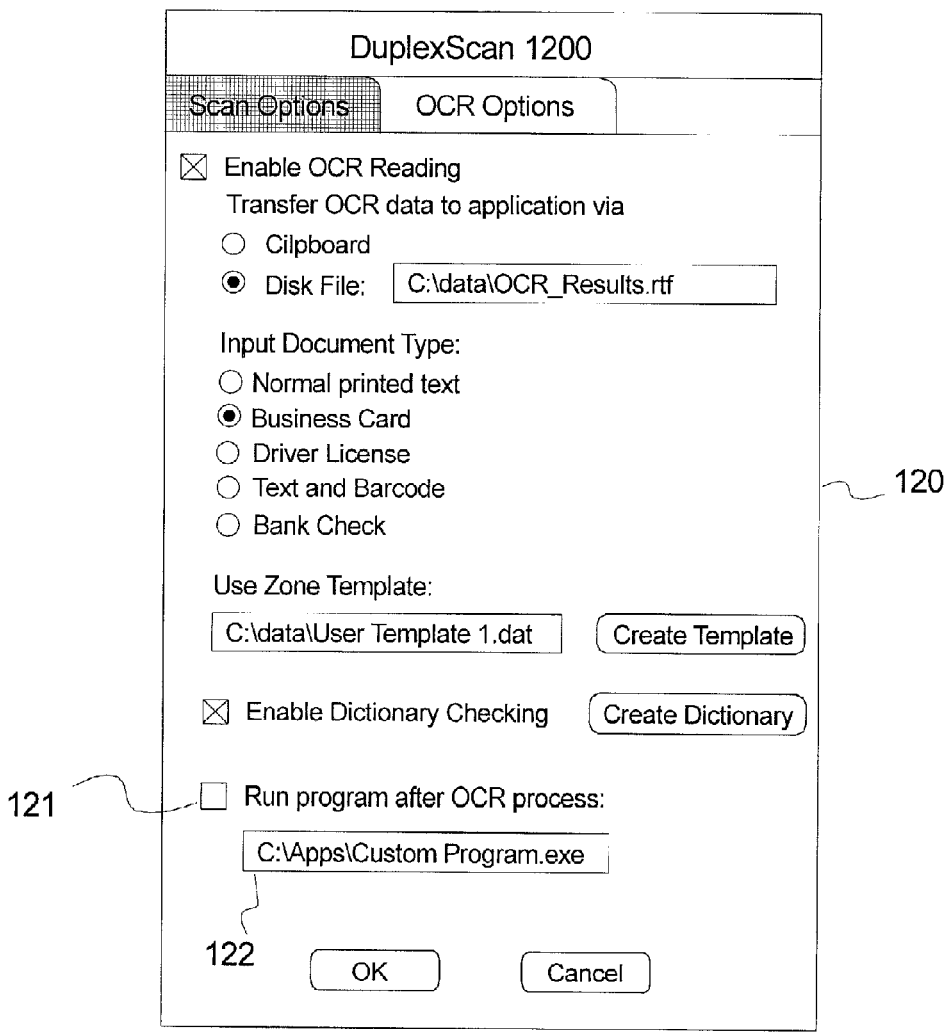
FIG. 12 shows a part of a graphics user interface of a system such as that shown in FIG. 10 and FIG. 11 in accordance with an embodiment of the invention.

In scanner source user interface 120 shown in FIG. 12, the user has the option to select a checkbox 121. If checkbox 121 is selected, after OCR is completed, a user selected program is run that is given access to the results of the OCR. The location of the program is set out in box 122. In another embodiment, the scanner source can execute a user selected program at any stage of the image acquisition process.

When the user finalizes the image acquisition, for example by selecting OK button 53 in dialog box 50 shown in FIG. 5, in a step 93, TWAIN scanner source 14 notifies application 12 that the transfer is ready. Then, in step 94, TWAIN scanner source 14 enters state 86, shown in FIG. 8. In a step 95, TWAIN scanner source 14 obtains the image from scanner 15.

In a step 96, OCR is performed to obtain machine editable text. As shown by FIG. 3, the OCR can be performed by an image acquisition and OCR block 32 within scanner source 14, or as shown by FIG. 4, the OCR can be performed by a OCR software 43 called by image acquisition block 42 within scanner source 14.

When in a step 97, application 12 initiates a transfer of the acquired image, in a step 98 TWAIN scanner source 14 enters state 87. In a step 99, TWAIN scanner source 14 transfers image data to application 12. In a step 100, TWAIN scanner source 14 copies the machine editable text obtained by OCR into a clipboard or text file, as specified by the user in dialog box 50.

In a step 101, TWAIN scanner source 14 sends to application 12 a transfer end message (TWC_XFERDONE msg) and in a step 102 waits for a response from application 12. When application 12 responds, in a step 103, TWAIN scanner source 14 exits state 87 to state 86 and then executes a step 105.

When in step 97, application 12 does not initiate a transfer and in a step 104 there is not an abort requested by application 12, TWAIN scanner source 14 returns to step 97 to wait for the application to initiate a transfer. If in step 104 an abort is requested by application 12, TWAIN scanner source 14 executes step 105.

If in step 105 more images need to be transferred, TWAIN scanner source 14 returns to step 95 and gets an image from scanner 15. If in step 105 there are no more images to be transferred, in a step 106, TWAIN scanner source 14 exits state 6 to state 85. In a step 107 TWAIN scanner source 14 notifies application 12 to disable TWAIN scanner source 14. In a step 108, TWAIN scanner source 14 waits to be disabled. When TWAIN scanner source 14 is disabled, in a step 109 TWAIN scanner source 14 exits state 85 and in a step 110 the transfer is complete.

Figure 10:
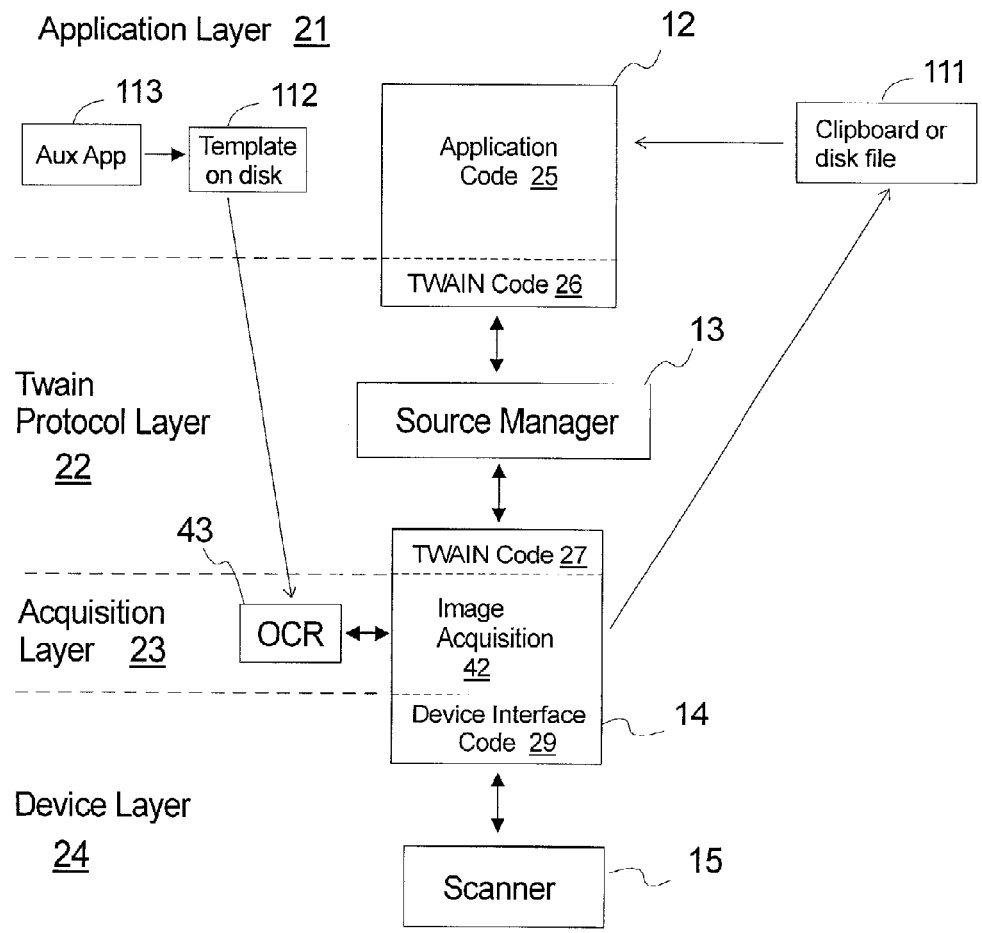
FIG. 10 shows a system in which OCR is performed in an image acquisition layer in accordance with another embodiment of the invention.
Figure 13:
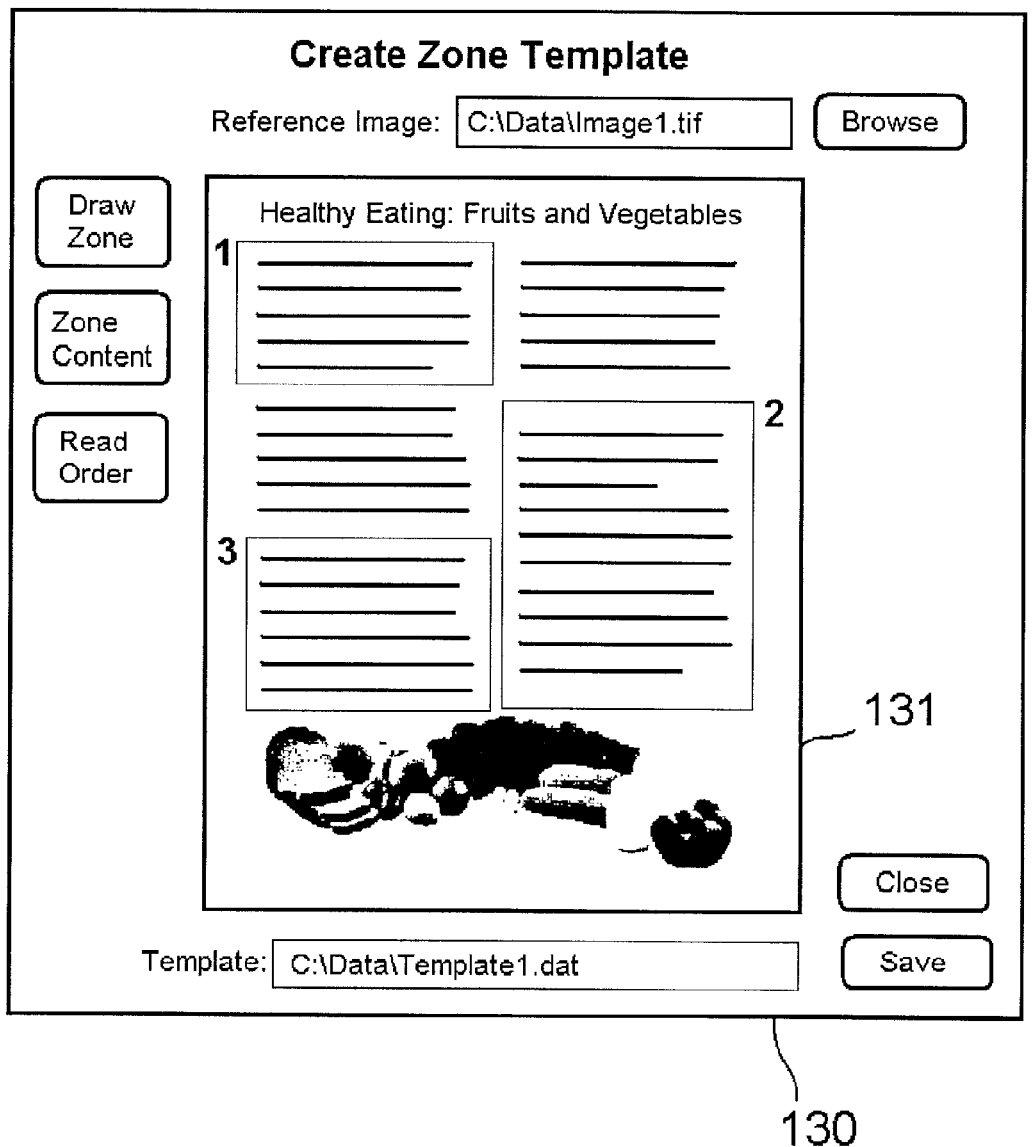
FIG. 13 shows a part of a graphics user interface of a system such when performing OCR in accordance with an embodiment of the invention.

In accordance with an embodiment of the invention, FIG. 10 shows that OCR software 43 is called by image acquisition block 42 within TWAIN scanner source 14 located within acquisition layer 23. OCR 43 uses a template 112 created by an auxiliary application 113 when performing OCR. FIG. 13 shows an example template 131 created within a graphics user interface 130 of auxiliary application 113. Zones from which machine editable text is obtained can be selected manually using graphics use interface 130 or automatically by OCR 43. Machine editable text 111 is forwarded to application 12 via a clipboard or disk file.

Figure 11:
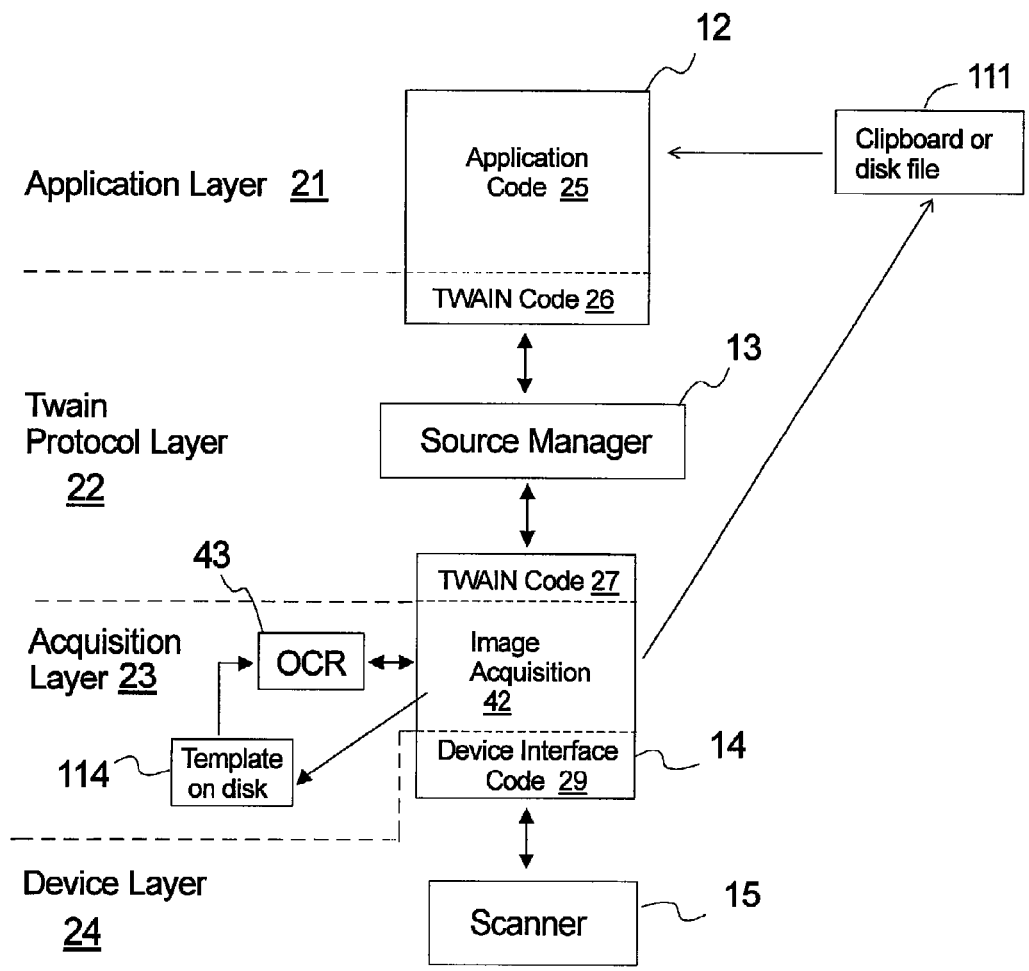
FIG. 11 shows a system in which OCR is performed in an image acquisition layer in accordance with another embodiment of the invention.

In accordance with another embodiment of the invention, FIG. 11 shows that OCR software 43 is called by image acquisition block 42 within TWAIN scanner source 14 located within acquisition layer 23. OCR 43 uses a template 114 which is created and managed by image acquisition block 42 within acquisition layer 23. Machine editable text 111 is forwarded to application 12 via a clipboard or disk file.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

I claim:

1. A system comprising:
an imaging device that acquires an image; and,
an acquisition layer logically located between a source manager operating in accordance with the TWAIN protocol and the imaging device, the source manager being called by an application when a user of the system requests to acquire the image, the acquisition layer including imaging acquisition logic that receives the image from the imaging device and performs optical character recognition (OCR) that extracts machine editable text from the image, wherein the acquisition layer forwards the image to the application and makes the machine editable text available to the user.

2. The system of claim 1 wherein the acquisition layer makes the machine editable text available to the user by placing the machine editable text in a system clipboard.

3. The system of claim 1 wherein the acquisition layer makes the machine editable text available to the user by placing the machine editable text in a disk file.

4. The system of claim 1 wherein the acquisition layer includes image acquisition and OCR software that performs both image acquisition and OCR.

5. The system of claim 1 wherein the acquisition layer includes image acquisition software that calls separate OCR software to perform OCR.

6. The system of claim 1 wherein the acquisition layer presents a user interface to the user that allows the user to select parameters used to scan the image, the parameters including whether OCR is to be performed.

7. The system of claim 1 wherein the acquisition layer makes the machine editable text available to the user before forwarding the image to the application.

8. The system of claim 1 wherein the acquisition layer makes the machine editable text available to the user as a part of the process of forwarding the image to the application.

9. The system of claim 1 wherein the acquisition layer uses an OCR template when performing OCR to extract machine editable text from the image.

10. The system of claim 1 wherein the acquisition layer uses an OCR template prepared by an auxiliary application when performing OCR to extract machine editable text from the image.

11. The system of claim 1 wherein the acquisition layer additionally executes a user selected program.

12. A method for scanning an image comprising:
sending, from a source manager operating in accordance with the TWAIN protocol to an acquisition layer, a request for an image, the request originating from an application;
scanning the image with a scanner in response to the request for the image being sent to the acquisition layer from the source manager;
performing by the acquisition layer optical character recognition on the image to obtain machine editable text, wherein the optical character recognition on the image is performed independent of the image as received by the application;
forwarding the image from the acquisition layer to the application; and,
forwarding the machine editable text from the acquisition layer to a location accessible by a user of the application.

13. The method of claim 12 wherein forwarding the machine editable text from the acquisition layer to a location includes at least one of the following:
placing the machine editable text in a system clipboard; and
placing the machine editable text in a disk file.

14. The method of claim 12 additionally comprising presenting a user interface to the user that allows the user to select parameters used to scan the image, the parameters including whether OCR is to be performed.

15. The method of claim 12 wherein performing optical character recognition on the image includes using an OCR template to extract machine editable text from the image.

16. The method of claim 12 wherein the location accessible by the user is accessible by a user selected program that is run when performance of the optical character recognition is complete.

17. The method of claim 12 additionally comprising:
executing a user selected program by the acquisition layer.

18. The system of claim 1 wherein optical character recognition (OCR) that extracts machine editable text includes extracting machine editable text from a bar code.

19. The method of claim 12 wherein optical character recognition on the image to obtain machine editable text includes extracting machine editable text from a bar code.

* * * * *